United States Patent
Larson

(10) Patent No.: US 8,146,559 B2
(45) Date of Patent: Apr. 3, 2012

(54) VEHICLE HYBRIDIZATION SYSTEM

(75) Inventor: Gerald L. Larson, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 447 days.

(21) Appl. No.: 12/506,378

(22) Filed: Jul. 21, 2009

(65) Prior Publication Data

US 2011/0017164 A1    Jan. 27, 2011

(51) Int. Cl.
    *F02N 7/00*    (2006.01)

(52) U.S. Cl. .......... 123/179.31; 60/625; 60/626; 60/627

(58) Field of Classification Search ............. 123/179.31, 123/179.3, 179.4, 481, 198 DB, 198 DC; 180/165, 53.4; 60/625, 626, 627, 629, 370, 60/371, 396, 407, 412, 413, 415, 416, 417, 60/418, 419, 911, 414
See application file for complete search history.

(56) References Cited

U.S. PATENT DOCUMENTS

| | | | | |
|---|---|---|---|---|
| 3,626,695 A * | 12/1971 | Jonsson | .......................... | 60/413 |
| 3,666,038 A * | 5/1972 | Hudspeth et al. | .............. | 180/302 |
| 3,744,602 A * | 7/1973 | Ajwani | .......................... | 477/182 |
| 3,765,180 A * | 10/1973 | Brown | .............................. | 60/370 |
| 3,917,027 A * | 11/1975 | Hakanson et al. | ............. | 184/6.3 |
| 4,110,981 A * | 9/1978 | Murphy | .......................... | 60/371 |
| 4,248,190 A * | 2/1981 | Grigsby | ..................... | 123/179.7 |
| 4,348,863 A * | 9/1982 | Taylor et al. | ..................... | 60/327 |
| 4,959,962 A * | 10/1990 | Hagin et al. | ..................... | 60/626 |
| 5,024,489 A * | 6/1991 | Tanaka et al. | ..................... | 303/3 |
| 5,050,936 A * | 9/1991 | Tanaka et al. | ..................... | 303/3 |
| 5,165,232 A * | 11/1992 | Amelio et al. | .................. | 60/416 |
| 5,528,901 A * | 6/1996 | Willis | .............................. | 60/626 |
| 6,460,500 B1 | 10/2002 | Ooyama et al. | | |
| 6,615,786 B2 | 9/2003 | Mori et al. | | |
| 6,705,266 B2 | 3/2004 | Tachikawa et al. | | |
| 7,117,836 B2 * | 10/2006 | Foster | ........................ | 123/179.4 |
| 7,832,207 B2 * | 11/2010 | McBride et al. | ............... | 60/410 |
| 7,900,444 B1 * | 3/2011 | McBride et al. | ............... | 60/410 |
| 2006/0053790 A1* | 3/2006 | Foster | ............................. | 60/629 |
| 2008/0201064 A1* | 8/2008 | DiGonis | ........................ | 701/110 |
| 2010/0018196 A1* | 1/2010 | Li et al. | ............................ | 60/415 |
| 2011/0120107 A1* | 5/2011 | Schwark et al. | ................ | 60/327 |

* cited by examiner

*Primary Examiner* — Stephen K Cronin
*Assistant Examiner* — Raza Najmuddin
(74) *Attorney, Agent, or Firm* — Jeffrey P. Calfa; Mark C. Bach

(57) ABSTRACT

A vehicle control system is programmed to stop the vehicle's internal combustion engine upon certain conditions including the vehicle being stopped and engine temperature having reached a minimum operating level. On vehicles equipped with air brakes and having an engine driven air compressor, engine restarts are provided by an air pressure supported hydraulic motor once triggered by operator actions such as releasing the brake and/or depressing the vehicle's accelerator indicative of the driver's intention to move the vehicle.

21 Claims, 4 Drawing Sheets

VEHICLE HYBRIDIZATION SYSTEM

BACKGROUND

1. Technical Field

The technical field relates to vehicle starter systems and more particularly to a vehicle starter system allowing use of the vehicle engine for regenerative braking and supporting operation of vehicle accessories when the vehicle's thermal or internal combustion engine is off.

2. Description of the Problem

Medium duty trucks employed for daytime small package deliveries are subject to relatively frequent stops and extended total idle time due to the urban traffic environment they are often used in and the many stops made for pick-ups and deliveries. Having drivers shut down the internal combustion engine of their vehicle when the vehicle is stopped to avoid engine idling is recognized by firms engaged in this business as effective in reducing fuel consumption and air pollution. However, increasing the frequency of shut downs also increases the frequency of engine restarts and this, in turn, increases wear on the vehicles' starter systems. Package delivery companies have found it economically viable to equip their vehicles with heavy duty starter systems built for durability to handle frequent restarts, notwithstanding the added expense of such systems.

However, even heavy duty electric starter motors accelerate relatively slowly under a cranking load. In addition, due to the step down gear ratios used with such motors, they usually crank the engine at lower RPMs than the engine idles at. Even with the use of a high capacity electric starter motor there can be a delay of a two or three seconds before an engine restarts during cranking. Thus it has been impractical to turn the engine off for many traffic stops due to the delay in following traffic.

Shutting off the engine also cuts power from vehicle accessories which are conventionally mechanically coupled to the engine for power, for example: power steering pumps; and air conditioning system compressors. In addition, some of these accessories are automatically shed when cranking using a starter motor. Engine shut downs done for traffic stops are not seamless operation for the driver due to loss of cab cooling and power steering.

SUMMARY

A vehicle control system is programmed to stop the vehicle's engine upon certain conditions potentially including any stop of the vehicle. Engine quick stops are usually restricted until the engine has reached a normal operating temperature. Engine restart after a quick stop is triggered by operator actions, such as releasing the brake and/or depressing the vehicle's accelerator. On vehicles equipped with air brakes and having an engine driven air-compressor, engine restart is done with an air pressure driven hydraulic motor. Power boost for vehicle accessories such as steering can also be maintained using available air pressure. Load monitoring and selective load shedding extend the period for which the engine can be off and reduce the load for cranking without loss of seamless operation.

DETAILED DESCRIPTION

Figure 1:
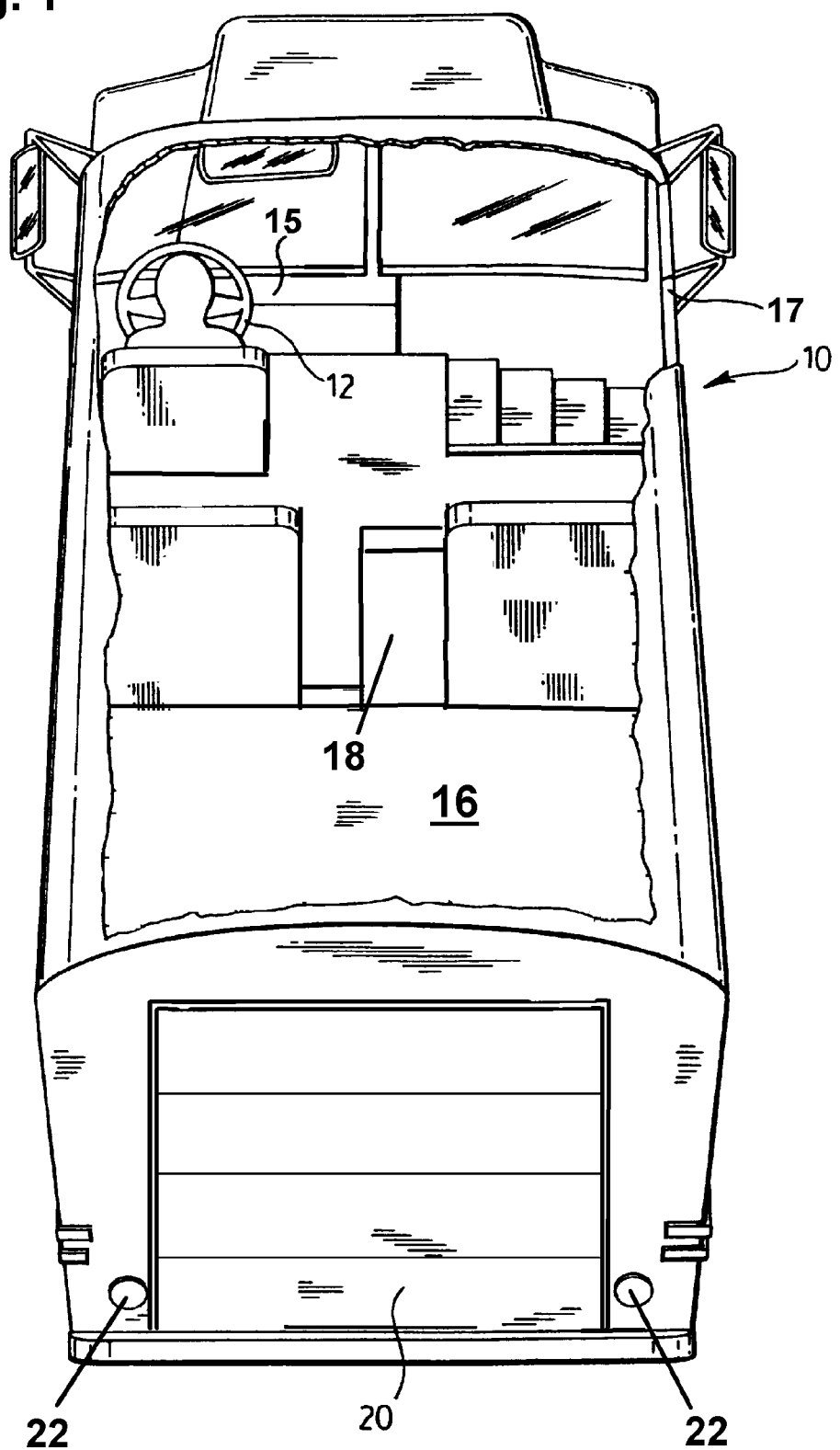
FIG. 1 is a cutaway view of a medium duty delivery truck showing the driver position.

Referring to FIG. 1, a medium duty delivery vehicle 10 is shown having a driver station 15 including a steering wheel 12 and other driver controls. Vehicle 10 is entered using a doorway 17 sometimes located along the non-driver side of the vehicle. A cargo area 16 may be accessed by an interior door 18 or a sliding rear gate 20. Vehicle 10 is equipped with various lights including tail lights 22 on the back of the vehicle. Vehicle 10 may be equipped with conventional climate control features, including heat and air conditioning (HVAC). Vehicle 10 may be equipped with power steering and power brakes. Typically vehicle 10 will have a compressed air system for air brakes.

Figure 2:
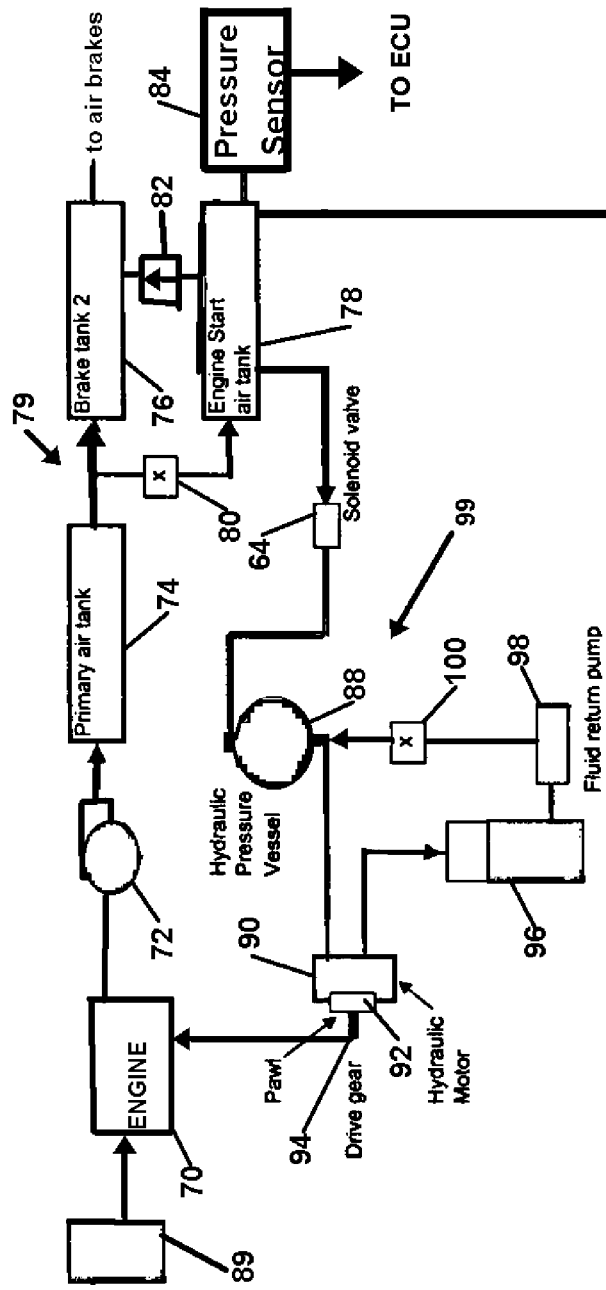
FIG. 2 is a high level schematic diagram on an engine cranking system for a rapid stop/start system.
Figure 2:
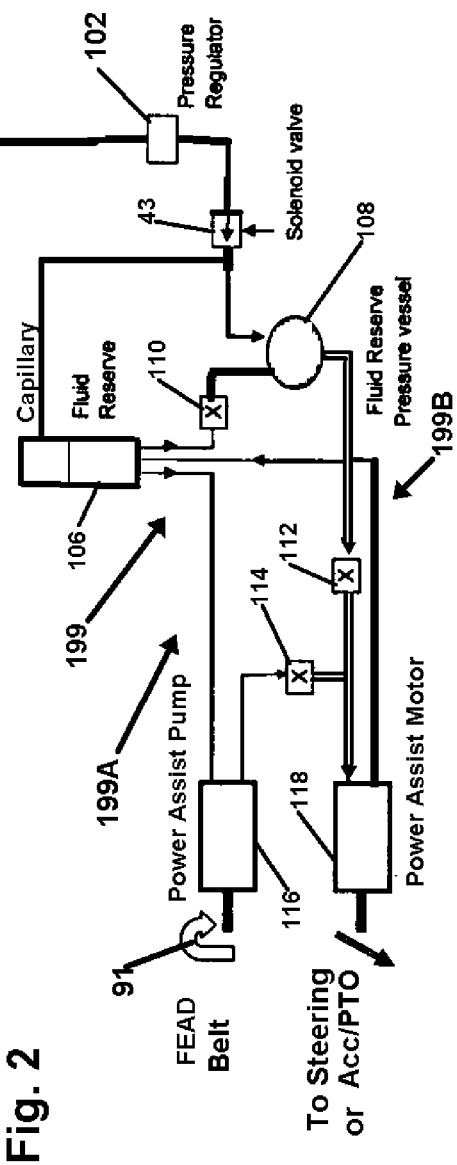

Referring to FIG. 2, a combined schematic for a hydraulic starter system 99 and power boost system 199 is shown. An air pump 72 compresses atmospheric gas and supplies the compressed air/gas for the vehicle's air brake system and to operate a hydraulic engine starter system 99. Internal combustion engine 70 is coupled, typically using a mechanical linkage, to drive air pump 72 which in turn supplies compressed air to a primary air tank 74. Primary air tank 74 is connected by an air distribution subsystem 79 to an engine start air tank 78 and a brake air tank 76. A check valve 80 blocks the return of air from start tank 78 to brake tank 76. A solenoid controlled return valve 82 may be located between the engine start air tank to the brake tank 76 which allows air to be supplied from the start tank 78 to the brake tank in case air pressure in the brake tank is lower than a preselected minimum. Pressure in the engine start tank 78 and the brake tank 76 may be monitored using pressure transducers, such as pressure transducer 84 for the engine start tank 78, and reported to an engine controller or body computer.

The air pressurization system for the vehicle air brake system or a separate air compression system may be used to pressurize the hydraulic starter system. An alternative air supply system is described in U.S. Pat. No. 6,922,997 to Larson et al. and is incorporated herein by reference. The '997 patent describes a vehicle high air pressure system utilizing a pressure amplifying pump driven by air exhausted into or pumped through the exhaust manifold of an internal combustion engine by the engine. Use of such a system here would allow use of a smaller air tank or air pressure accumulator since the system could operate at a higher pressure than conventional truck air brake systems.

The vehicle is equipped with a conventional direct current electric starter motor 89 and the hydraulic starter system 99. For the hydraulic starter system 99 compressed air is supplied from the engine start air tank 78 under the control of a body computer or engine controller/ECU (described below). The hydraulic starter system 99 is normally used after the engine 70 has been operated long enough for engine to be in a normal operating temperature range, although hydraulic starting could be used when the engine is cold. For engine 70 cranking air is delivered from the engine start air tank 78 to a hydraulic pressure vessel 88 by a solenoid controlled start control valve 64. At the same time, a pawl 92 is used to engage hydraulic motor 90 to a drive gear 94 which is mechanically coupled to the crankshaft of engine 70. Upon application of air pressure to the hydraulic pressure vessel 88 hydraulic fluid is forced from the vessel the hydraulic motor 90 to provide power to a drive gear 94 for cranking engine 70. Once the engine begins to run, the body computer disengages the pawl 92 to decouple drive gear 94 from motor 90.

Fluid from hydraulic pressure vessel 88 passing through hydraulic motor 90 is discharged through hydraulic motor 90 to a reservoir 96. A fluid return pump 98 returns hydraulic fluid discharged by the motor 90 into a reservoir 96 via a check valve 100 to the pressure reservoir 88. The fluid return pump 98 may be operated by an electric motor which engages after solenoid valve 64 closes and when engine 70 is running and alternator power is available. Hydraulic motor 90 should have sufficient power to crank engine 70 at the engine's idle speeds, and to accelerate the engine relatively quickly to those speeds.

An automatic shut down of engine 70 for a traffic stop may be made operationally transparent to the driver if there is no loss of power steering and power brake boost assist remains present. In other words, even though the engine 70 is off, power steering and power brakes are still available. Compressed air from the engine start tank 78, or other pressurized air source, can be used to provide bridging power to the power steering system while the engine 70 off.

A power assist system 199 is applicable to a power steering system, or other engine driven accessory or power take-off system (PTO), and allows the use of compressed air as an alternative prime mover for either steering or another accessory when the vehicle engine 70 is off. Power assist boost system 199 is supplied with compressed air from engine start tank 78 (or other pressurized air source) by a pressure regulator 102 and a body computer controlled solenoid valve 43 when the engine is off. When the engine 70 is on, the power assist boost system 199 is driven by a mechanical connection (typically a front engine accessory drive (FEAD)) belt between engine 70 and pump 116. Steering, or another accessory or power take-off application, receives a power boost (or is driven by) from the power assist motor 118. Hydraulic fluid can be supplied to the power assist motor 118 or other pressure utilizing system from check valve 114 or check valve 112. Working fluid is supplied through check valve 112 when under pressure in pressure vessel 108. It is supplied through check valve 114 when power assist pump 116 is driven by engine 70. Power assist pump 116 supplies hydraulic fluid to the motor 118 from reserve tank 106. Hydraulic fluid is returned to reserve tank 106 from motor 118 regardless of its immediate source. Solenoid valve 43 is to be opened when engine 70 is not running and closed when the engine is running.

Whether engine 70 or air pressure actuated, power assist boost system 199 uses the same working fluid. When power assist boost system 199 is engine 70 powered, the working fluid is pressurized using a power assist pump 116 in sub-circuit 199A (power assist pump 116 and check valve 114). Power assist pump 116 is driven by engine 70. When power assist boost system 199 is actuated by compressed air, the working fluid is pressurized in fluid reserve pressure vessel 108 which is part of a hydraulic sub-circuit 199B (check valve 110, fluid reserve pressure vessel 108 and check valve 112). A power assist motor 118 (if present for a power steering application, accessory or other power take-off application) and a fluid reserve tank 106 are common to both sub-circuits 199A and 199B. The fluid reserve tank 106 supplies each of the sub-circuits 199A and 199B with working fluid.

Fluid reserve tank 106 is connected by a conduit to the power assist pump 116 and by a check valve 110 to the fluid reserve pressure vessel 108. During engine 70 operation pump 116 draws hydraulic fluid from the fluid reserve tank 106. Fluid reserve tank 106 can supply fluid reserve pressure vessel 108 with working fluid through a check valve 110 by gravity feed until the fluid reserve pressure vessel 108 is full. Upon an engine 70 shut down, with a consequent discontinuance of pumping by pump 116, and opening of valve 43, air pressure from the engine start air tank 78 is applied through valve 43 to the fluid reserve tank 108 which causes working fluid to circulate from the fluid reserve tank 108 via check valve 112 to the power assist motor 118. The outlet from valve 43 is also connected by a capillary to fluid reserve tank 106 to balance the pressure in the reserve tank 106 and vessel 108 so fluid may continue to drain from the tank 106 to the vessel 108. A check valve 110 prevents working fluid, or air, from escaping the pressure vessel 108 back to the reserve tank 106.

With engine 70 running, power steering and air brake functionality is conventional. With the engine off, and armed for quick restart, the check valves function to direct pressurized fluid to the assist motor 118 bypassing the power assist pump 116 to provide full power steering. The air brake system operates conventionally.

Figure 3:
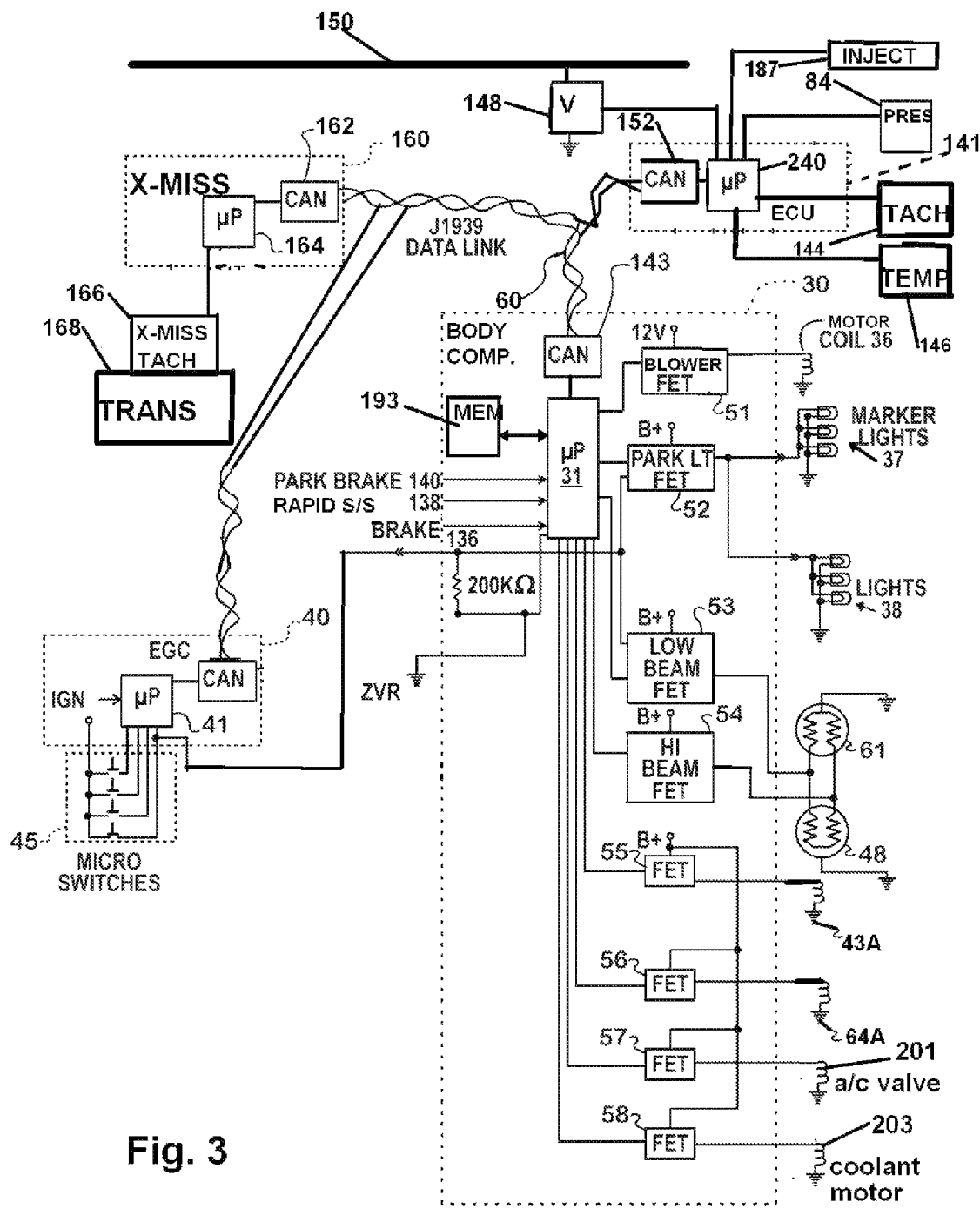
FIG. 3 is a schematic of a control system for implementing load shedding features of the engine cranking system of FIG. 2.

FIG. 3 is a schematic illustrating one possible arrangement for integrating control of the starter system with an existing vehicle control system. Vehicle control systems may incorporate a body computer or electrical system controller 30. Such body computers 30 communicate with more specialized controllers such as an engine control unit (ECU) 140, a transmission control unit 160 and a gauge controller (EGC) 40. Communication is implemented over a controller area network (CAN) implemented by CAN communication modules 162, 152, 143 and 133 and a network bus. A twisted wire pair conforming to the SAE J1939 standard (J1939 data link 60) is a suitable network bus.

Load control/shedding can be implemented from the body computer 30 communicating with other controllers over the J1939 data link 60 to disconnect engine driven loads to reduce the loads on the hydraulic starter system 99 applied to the starter system through engine 70 and ease fast cranking of engine 70.

Body computer 30 comprises a microprocessor 31 which can access a memory 143. Memory 143 includes volatile and non-volatile sections and can be used to store programs for execution by microprocessor 31 in order to implement computer control of the quick start system. Body computer 30 is equipped with a plurality of field effect transistor (FET) switches 51, 52, 53, 54, 55, 56, 57 and 58 which in turn control application of power to a number of devices. For the sake of simplicity, arrangements for staged control of some functions are omitted. FET 51 represents control over a blower motor 36 used with the vehicle's cab climate control system. Park Light FET 52 is connected to control illumination of various park and identification lights 37, 38. FETs 53 and 54 are connected to control illumination of the vehicle's low and high beam headlights 61, 48. FET 55 is connected to control the state of solenoid 43A which in turn opens and closes valve 43 for the power steering system. FET 56 is shown connected to deliver power to solenoid coil 64A associated with the hydraulic starter system 99. FETs 57 and 58 are shown connected to supply power to an A/C valve 201 and a coolant motor 203, respectively. These represent possible additions to the control arrangements for the quick start system. Control of coolant motor may be located with the ECU 140 rather than the body computer 30.

Body computer 30 implements the control regime in response to various inputs, including user actuation of the rapid stop/start system switch input 138. Switch input 138 may be applied directly to the body computer 30 as shown, or as a switch input to EGC 40. Restart signals will typically involve the brakes, and brake status is communicated to the body computer through switch inputs 140, 136 to the microprocessor 31. In addition, rapid restart is armed only when the ignition is on. Ignition status is supplied by EGC 40 to body computer 30 based on the status of the IGN switch input to microprocessor 41 in EGC 40.

Rapid stop/start is armed when the engine operating temperature meets a minimum level. Engine temperature is illustrated as monitored by temperature sensor 146 connected as an input to a microprocessor 240 in ECU 140. ECU 140 also provides for monitoring the air pressure sensor 84, reporting engine 70 rpms from a tachometer 144 and for reporting electrical voltage on the vehicle power bus 150 from a voltage sensor 148. Engine speed should not exceed idle levels before engine 70 is shut off. Engine shut off may be accomplished by cutting operation of the fuel injectors 187. To accommodate some power take-off applications (PTO) it may be provided that PTO actuation cancels arming of the rapid stop/start, or the higher engine speeds initiated in response to an actual PTO operation initiate an engine restart on PTO equipped vehicles. Alternatively, a PTO vocation powered by a power assist system 119 may be accommodated without the introduction of such interlocks.

Vehicle speed is monitored as a condition of turning the engine 70 off. Vehicle speed may be determined from a transmission tachometer 166 coupled to the output shaft of the vehicle transmission 168. These data are supplied to the body computer 30 from a transmission controller 160 and its microprocessor 164.

Differing control regimens may be implemented depending upon the control features available. In one version quick or rapid stop/start is enabled after engine temperatures considerations are met. An air conditioning expansion valve is activated (by operation of solenoid 201) regardless of heating, ventilation, air conditioning (HVAC) system settings. At minimum or zero vehicle speed, with the service brake applied, the engine is turned off. Electrical power available on bus 150 is then monitored. If bus/battery voltage falls below 11.5 volts DC all loads with the exception of flashers 38 and marker lamps 37 will be shut down. If the headlamps 61, 48 are on they revert to their daytime running light state. If battery/bus voltage exceeds 11.5 volts DC accessory and lamp functions are maintained in the status they were at before the engine was shut down. Blower motor 36 will move to its low setting and the HVAC system will otherwise continue to operate at operator selected settings.

Load control may be modified as a function of ambient temperature. At cold temperatures, an electric coolant pump (driven by coolant motor 203 which may be an electric motor or another iteration of power assist system 119) may be provided to maintain circulation of engine coolant to the HVAC system when the engine is shut down. In hot temperatures, the blower fan for the evaporator may be operated for temporary cooling while the compressor is off. Alternatively, a eutectic package (with an integral expansion valve) may be added to the refrigeration loop. This provides a heat sink to be collocated with the evaporator for use when the engine is shut down to extend the cooling period that can be obtained.

Figure 4:
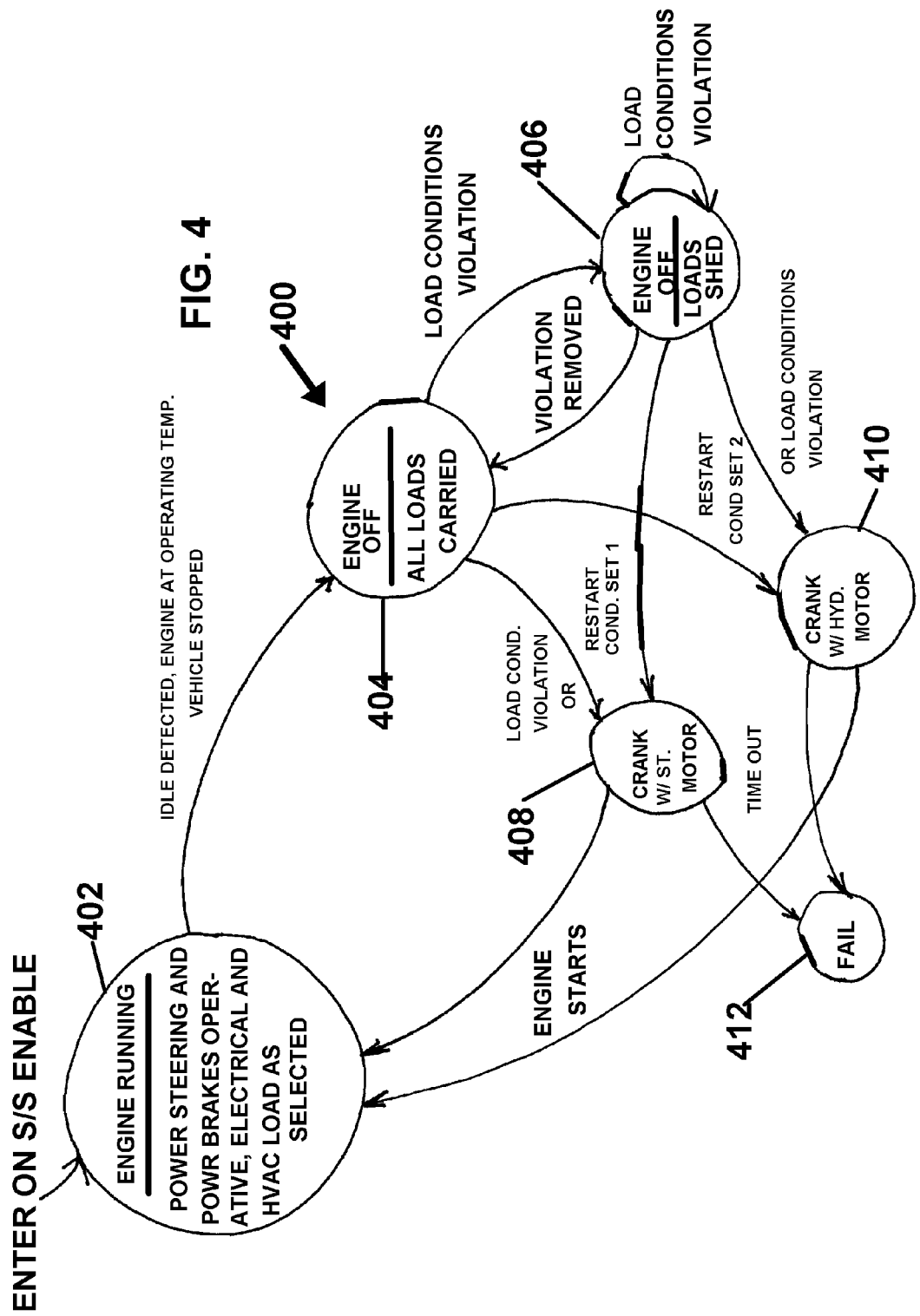
FIG. 4 is a state machine for a rapid stop/start system.

FIG. 4 is a representative, high level state machine 400 illustrating possible operation of the rapid stop/start system by the control system of FIG. 3. The state machine 400 assumes manual control over arming of the rapid stop/start system through operator selection. State 402 represents the system armed with the engine 70 running. Power steering and power brakes are operative, and various electrical and cab climate loads are assumed to have been selected by the operator/driver. With brakes applied, vehicle speed below a maximum allowed value, engine temperature reasonably close to its operating norm and minimum air pressure levels available the state shifts to an engine off state 404, armed for a rapid restart of the engine 70. Initially the climate and electrical loads already active are carried. Air pressure to operate power assist for the brakes and steering is supplied to continue operation of those accessories using air pressure as an alternative prime mover for as long as the engine is off. In other words, were the driver stopped for traffic, he or she would not feel a loss of steering boost nor would the air brakes discontinue operation.

Deterioration in the voltage state, or loss of air pressure would represent a load condition violation and the state would change depending upon the character of the violation. A deteriorating electrical state could be dealt with by shedding the electrical loads, as represented by state 406. State 406 represents various electrical loads having been shed, possibly as the result of a progressive series of transitions feeding back on state 406. Alternatively, a load condition violation, if it persists or exceeds other thresholds, may be dealt with by cranking the engine for a restart, either hydraulically (state 410) for an electrical load condition violation or electrically (state 408) for a pressure condition violation. It is possible that the load condition violation could be removed by connection of the vehicle to an external air or power source, or operation of an auxiliary power unit, if available. Accordingly a transition from state 406 back to state 404 is shown. Electrical and cab climate control related loads may be shed during cranking states though power steering and power brakes normally would not lose boost.

Restart conditions may be selected. An example might involve loss of one of the shut off conditions, or combination of such a loss with another operator action, such as depressing the gas pedal or deactivation of the rapid stop/start system. From either state 404 or state 406 there is a transition to an engine cranking state, either using the conventional starter (state 408) if air pressure is inadequate, or to cranking with the hydraulic motor (state 410), if available. Start of the engine effects a transition from state 408 or 410 to state 402, with the engine running and any shed loads being restored to operation. Failure of cranking after a time out period results in transition to a fail state 412. This may provide for operator election of alternative cranking.

The present system provides for some regenerative power capture by loading the engine with the air compressor 72 during braking. A clutch mechanism may be introduced to the engine 70 to air compressor 72 power transmission mechanism to restrict compression of air for engine restarts to instances of braking. Such an arrangement might be used on a vehicle not equipped with air brakes. The engine 70 itself might be used as air pump for the start air tank 78 by modification of a Jepson engine brake to direct compressed air to the start air tank. An engine brake application would work with the pressure amplifier taught in U.S. Pat. No. 6,922,997.

What is claimed is:

1. A motor vehicle comprising:
    an internal combustion engine;
    a pressurized air source driven by the internal combustion engine;
    a starter hydraulic circuit coupled to the pressurized air source, the starter hydraulic circuit including an hydraulic motor for cranking the internal combustion engine;
    a controller responsive to detection of engine idling for shutting off the internal combustion engine; and
    the controller being further responsive to detection of selected motor vehicle operations for supplying air under pressure from the pressurized air source to the starter hydraulic circuit to run the hydraulic motor.

2. A motor vehicle as claimed in claim 1, further comprising:
the pressurized air source including an air compressor driven by the internal combustion engine and a pressure tank, the air compressor being coupled to supply air under pressure to the pressure tank; and
a start control valve connecting the pressure tank to the starter hydraulic circuit, the controller controlling opening and closing of the start control valve.

3. A motor vehicle as claimed in claim 2, further comprising:
a brake air tank coupled to the air compressor.

4. A motor vehicle as claimed in claim 2, further comprising:
a drive gear coupled to the internal combustion engine; and
a positionable pawl for engaging the hydraulic engine with the drive gear.

5. A motor vehicle as claimed in claim 2, the controller further comprising:
a body computer;
a plurality of data inputs to the body computer including vehicle speed, internal combustion engine speed and internal combustion engine operating temperature;
an engine controller providing control over fuel flow to the internal combustion engine; and
the body computer being responsive to the data inputs being consistent with the vehicle having stopped and the internal combustion engine idling for directing the engine controller to shut down the internal combustion engine.

6. A motor vehicle as claimed in claim 4, further comprising:
a body computer;
a plurality of sources of data relating to vehicle operating conditions including speed, internal combustion engine speed, internal combustion engine temperature, accelerator position, brake status and vehicle power demand;
means for applying the data to the body computer;
an engine controller providing control over operation of the internal combustion engine;
the body computer being responsive to data inputs consistent with idling of the internal combustion engine and engine temperature exceeding a minimum operational threshold for directing the engine controller to turn the internal combustion engine off; and
the body computer being responsive to data inputs consistent with a demand for internal combustion engine power following the engine having been turned off due to idling for engaging the hydraulic motor to the internal combustion engine and applying air pressure to the starter hydraulic circuit to crank the internal combustion engine.

7. A motor vehicle as claimed in claim 6, further comprising;
means for allowing operator election of automatic shut off the internal combustion engine.

8. A motor vehicle as claimed in claim 5, further comprising:
an pressurized air actuated hydraulic power assist system;
means for applying pressurized air to the pressurized air actuated hydraulic power assist system responsive to automatic shut off of the internal combustion engine.

9. A motor vehicle as claimed in claim 8, further comprising:
a power boosted steering system including a hydraulic motor; and
the pressurized air hydraulic power assist system providing pressurized working fluid to the hydraulic motor of the power boosted steering system.

10. A motor vehicle as claimed in claim 8, further comprising:
the hydraulic power assist system providing power in substitution for a front engine accessory drive belt.

11. A starter system for an internal combustion engine, comprising:
an electric starter motor for cranking the internal combustion engine;
a hydraulic circuit including an hydraulic motor for cranking the internal combustion engine;
an air tank connected to supply compressed air to the hydraulic circuit;
a controller responsive to idling of the internal combustion engine for automatic shut off the internal combustion engine; and
the controller being further responsive to detection of engine power demands occurring subsequent to the automatic shut off of the internal combustion engine for supplying compressed air from the air tank to the hydraulic circuit to run the hydraulic motor to crank the internal combustion engine.

12. A starter system as claimed in claim 11, further comprising:
an air compressor driven by the internal combustion engine and coupled to deliver compressed air to the air tank; and
a valve under the control of the controller providing part of the connection between the air tank and the hydraulic circuit.

13. A starter system as claimed in claim 12, further comprising:
the controller being further responsive to operating temperature of the internal combustion engine being below a minimum temperature for preventing automatic shut down of the internal combustion engine.

14. A starter system as claimed in claim 13, further comprising:
a front engine accessory drive belt;
an accessory connected to the front engine accessory drive belt for operation; and
a air driven hydraulic boost circuit connected to operate the accessory.

15. A motor vehicle comprising:
an internal combustion engine;
a gas tank for storing compressed gas;
an hydraulic circuit coupled to the gas tank and including an hydraulic motor for cranking the internal combustion engine upon application of compressed gas from the gas tank to the hydraulic circuit;
means for detecting idling of the internal combustion engine;
means responsive to detection of idling for performing a shutdown of the internal combustion engine; and
means for restarting the internal combustion engine by applying compressed gas from the gas tank to the to the hydraulic circuit to run the hydraulic motor.

16. A motor vehicle as claimed in claim 15, further comprising:
a compressed gas actuated power assist hydraulic circuit; and
means responsive to shutting off the internal combustion engine for connecting the compressed gas actuated power assist hydraulic circuit to the gas tank.

17. A motor vehicle as claimed in claim 16, further comprising:

an air compressor driven by the internal combustion engine, the air compressor being coupled to the gas tank to deliver compressed air to the gas tank.

18. A motor vehicle as claimed in claim 17, further comprising:
means for mechanically engaging the hydraulic motor with the internal combustion engine.

19. A motor vehicle as claimed in claim 13, further comprising:
means for providing vehicle speed, internal combustion engine speed and internal combustion engine operating temperature data to the means for detecting engine idling.

20. A motor vehicle as claimed in claim 19, further comprising:
the means for performing being responsive to internal combustion engine operating temperature being above a minimum operating temperature prior to performing a shut down.

21. A motor vehicle as claimed in claim 19, further comprising:
means responsive to an operator input for activating and deactivating the means for performing and the means for restarting.

* * * * *